United States Patent

[11] 3,537,600

| [72] | Inventor | Commodore A. Schuchmann<br>112 Crest Haven Drive, Belleville, Illinois 62221 |
|---|---|---|
| [21] | Appl. No. | 760,484 |
| [22] | Filed | Sept. 18, 1968 |
| [45] | Patented | Nov. 3, 1970 |

[54] ROLLOVER BARGE UNLOADER
12 Claims, 6 Drawing Figs.

[52] U.S. Cl. .................................................. 214/12,
214/314, 214/52
[51] Int. Cl. .................................................. B65g 63/00
[50] Field of Search .................................... 214/1(R)
314, 12, 52(C), 312, 313

[56] References Cited
UNITED STATES PATENTS
1,646,815  10/1927  Glassen .......................... 214/52

| 2,865,516 | 12/1958 | Hedderich .................. | 214/1 |
| 3,428,193 | 2/1969 | Miller ........................... | 214/12 |
| 3,429,461 | 2/1969 | Fenchel ...................... | 214/12 |
| 1,600,416 | 9/1926 | McEwan ..................... | 214/312 |
| 2,664,218 | 12/1953 | Johnson et al. ............. | 214/314X |
| 2,755,001 | 7/1956 | Doepre et al. .............. | 214/314X |

Primary Examiner—Gerald M. Forlenza
Assistant Examiner—Frank E. Werner
Attorneys—Clarence A. O'Brien and Harvey B. Jacobson ABSTRACT: An unloader including a horizontally disposed elongated body structure journaled for rotation about a longitudinal axis and defining an entrance opening into which an upright load carrier may be advanced for support from the body structure. The body structure includes a generally radial outlet opening from which a load from within a load carrier supported from the body structure may be dumped upon rotation of the body structure and the load carrier therein to a position with the load carrier in inverted position.

Patented Nov. 3, 1970
3,537,600
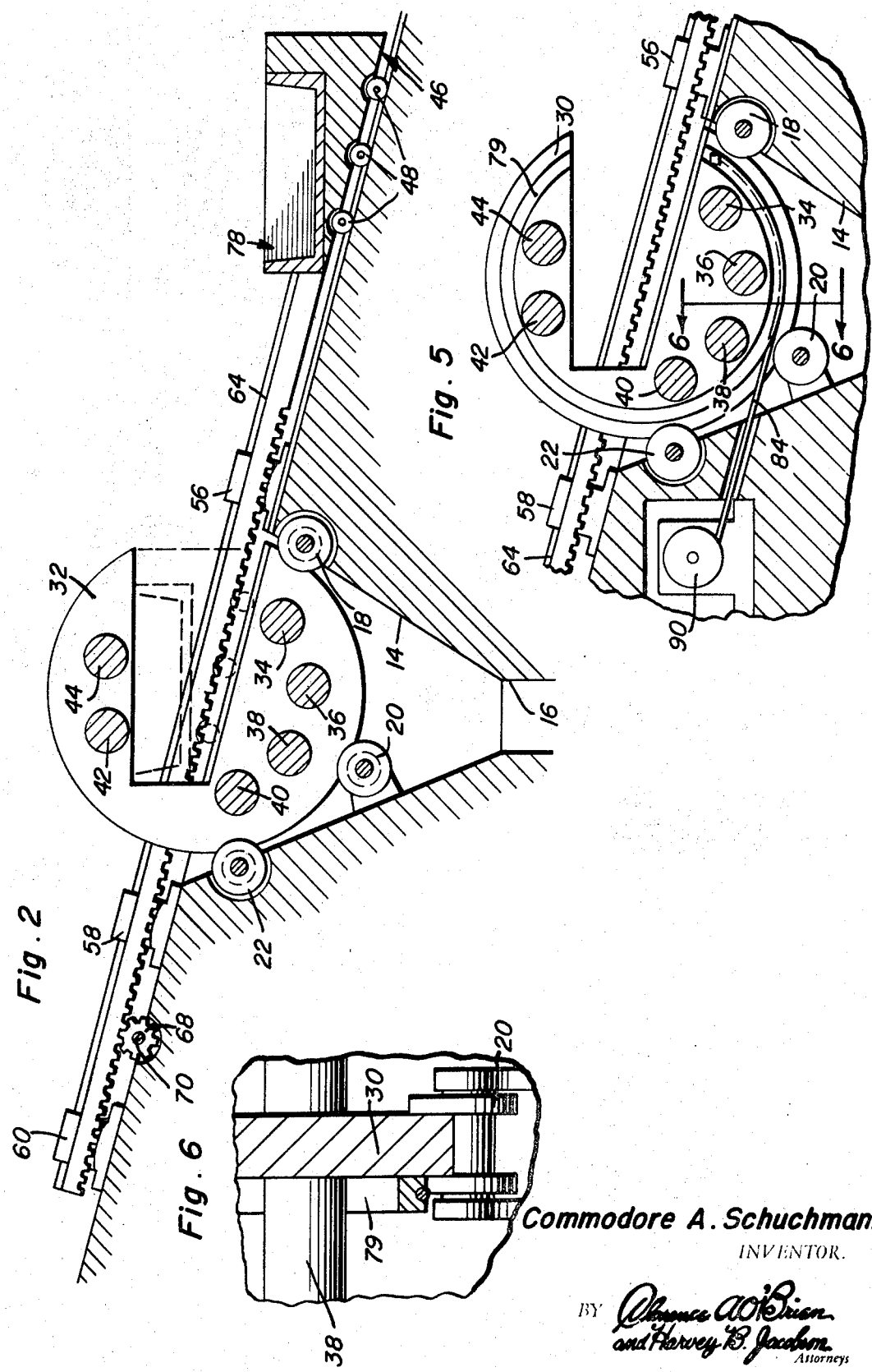
Commodore A. Schuchmann
INVENTOR.

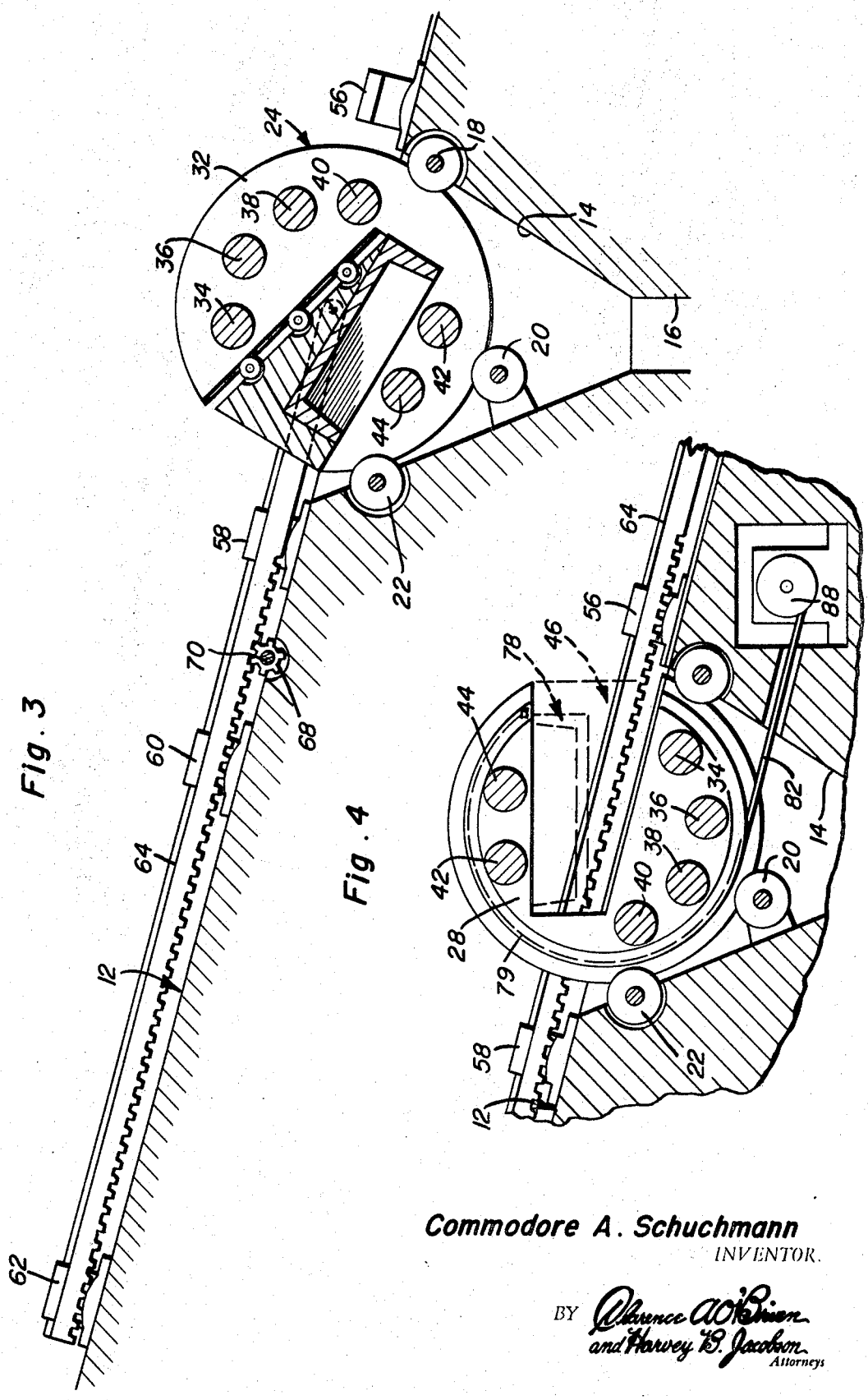

ROLLOVER BARGE UNLOADER

The unloader of the instant invention has been primarily designed to provide a means whereby heavily laden barges may be floated to a given location on water, hoisted clear of the water, and rotated to an inverted dumping position prior to subsequently being rotated back to an upright position and lowered back into the water.

Conventional methods of transporting and handling bulk materials sometimes includes the utilization of a land vehicle such as a truck or railway car and the supporting of such a land vehicle in a rotatable or swinging manner for movement from an upright position to an inverted dumping position. However, most structures utilized in supporting and rotatably or swingably shifting such vehicles to inverted dumping positions include complicated structures for securely fastening the vehicles to be dumped to the supporting structure by which the vehicles are to be dumped. In addition, most of these supporting structures are specifically adapted to handle railway cars or trucks and not barges which may represent the most economical mode of transporting bulk materials from a point of origin to a delivery point if sufficient waterways extend between the point of origin and the delivery point.

Accordingly, it is the main object of this invention to provide a simplified structure for receiving, supporting and inverting barges loaded with bulk material and also to provide companion structure whereby floating loaded barges may be readily elevated from a floating position to the supporting structure by which they are to be inverted.

Another object of this invention is to provide a barge unloading structure whose uncomplex structural features are of a design which inherently enables them to handle extremely heavily laden barges in the desired manner, even though a barge to be unloaded may weigh in excess of 1,000 tons.

A final object of this invention to be specifically enumerated herein is to provide a barge unloader which will conform to conventional forms of manufacture, be of simple construction and easy to operate so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an enlarged vertical sectional view taken substantially upon the plane indicated by the section line 2–2 of FIG. 1;

FIG. 3 is an enlarged vertical sectional view similar to FIG. 2 but with a barge supported from the support body of the unloader in an inverted dumping position;

FIG. 4 is an enlarged fragmentary vertical sectional view taken substantially upon the plane indicated by the section line 4–4 of FIG. 1;

FIG. 5 is an enlarged fragmentary vertical sectional view taken substantially upon the plane indicated by the section line 5–5 of FIG. 1; and FIG. 6 is an enlarged fragmentary vertical sectional view taken substantially upon the plane indicated by the section line 6–6 of FIG. 5.

Figure 1:
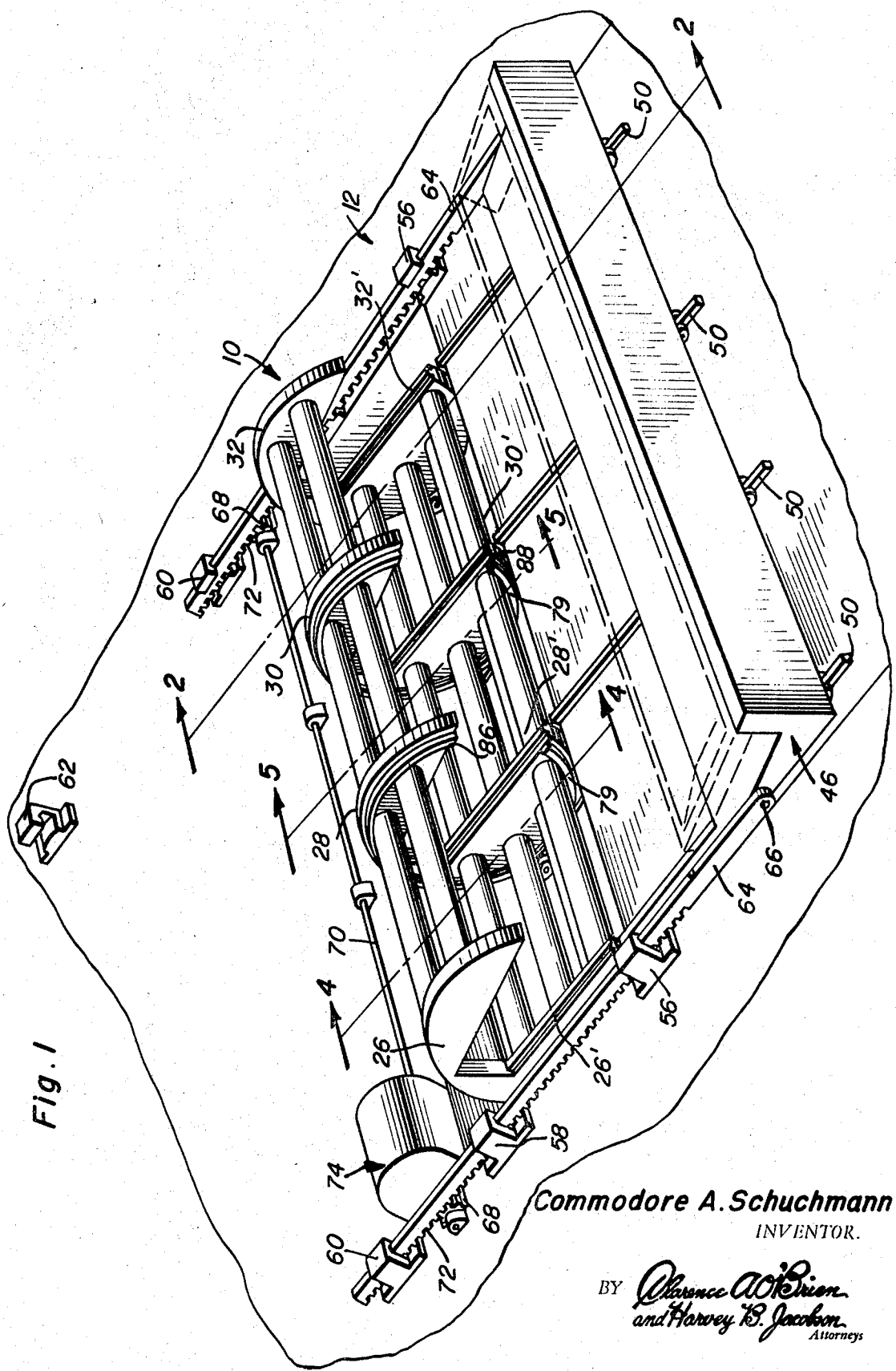
FIG. 1 is a perspective view of the barge unloader.

Referring now more specifically to the drawings, the numeral 10 generally designates the barge unloader which includes an inclined ramp structure referred to in general by the reference numeral 12 having a hopperlike opening or recess 14 formed therein which opens upwardly through the upper surface of the ramp structure 12 intermediate its upper and lower ends and which terminates downwardly in a discharge throat 16 leading to lower storage bins (not shown).

The opening or recess 14 includes three sets of axially spaced flanged support rollers 18, 20 and 22 with there being provided four roller each of rollers 18, 20 and 22 spaced longitudinally of the recess 14 which extends across the ramp structure 12. The rollers of each set of rollers are radially aligned with corresponding rollers in the other sets of rollers and each group of corresponding rollers are arranged relative to each other to rollingly support a circular disk member.

The barge unloader 10 also includes a support body structure referred to in general by the reference numeral 24 including four axially spaced support disks 26, 28, 30 and 32 interconnected by means of five axially extending rods 34, 36, 38, 40 and 42 extending between and secured to the disks 26, 28, 30 and 32. The latter are rollingly supported from the support rollers 18, 20 and 22 and it may therefore be appreciated that the elongated support body structure 24 is journaled for oscillation about its longitudinal axis by the rollers 18, 20 and 22.

The support disks 26, 28, 30 and 32 include axially registered wedge-shaped and generally radially outwardly opening recesses designated by corresponding prime numerals and these recesses together form an inlet opening or pocket in which to receive a load carrier generally referred to by the reference numeral 46 also comprising a part of the barge unloader and which is in the form of an elongated wheeled dolly including longitudinally and transversely spaced flanged support wheels 48 which rollingly engage a plurality of support rails suitably secured to and supported from the upper surface of the ramp structure 12 and which extend along the ramp structure 12 and parallel each other. The support rails 50 are radially aligned with the support disks 26, 28 and 30 and the portions of the support disks 26, 28, 30 and 32 which define the lower inclined extremities of the recesses or notches 26', 28', 30' and 32' define continuations of the support rails 50 along which the support rollers 48 may also roll when the support body structure 24 is in the upright position illustrated in FIGS. 1, 2, 4 and 5 of the drawings.

The barge unloader 10 additionally includes sets of aligned guides 56, 58, 60 and 62 spaced along opposite side portions of the ramp structure 12 and with which a pair of elongated rack gears 64 are engageable. The lower ends of the rack gears 64 are pivotally secured to opposite ends of the load carrier or wheeled dolly 46 by means of pivot shafts 66 and a pair of spur gears 68 carried by opposite ends of a transverse shaft 70 journaled from the ramp structure 12 above the opening or recess 14 are meshed with the gear teeth 72 formed along the undersurface of the rack gears 64. The shaft 70 is driven by a combined electric motor and gear reduction assembly referred to in general by the reference numeral 74 which may be reversed in operation and accordingly, it may be seen that the load carrier or wheeled dolly 46 may be raised and lowered along the ramp structure 12 by means of the assembly 74.

It is to be understood that the lower end of the ramp 12 extends down into the water alongside a river or the like and that a barge such as that generally referred to by the reference numeral 78 may be floated upon the load carrier or wheeled dolly 46 when the latter is in its lowered position such as that illustrated in FIG. 2 of the drawings.

The support disks 28 and 30 include partial circular guides and anchors 79 secured to corresponding sides of the support disks 28 and 30 and about which the free ends of a pair of elongated flexible actuating cables 82 and 84 are trained and secured as at 86 and 88. The base ends of the actuating cables 82 and 84 are secured to and partially wound upon synchronous motor driven winding drums 88 and 90 supported within the ramp structure 12 below its upper surface and on opposite sides of the opening or recess 14. Accordingly, it may be seen that the synchronous motor driven winding drums 88 and 90 may be utilized to oscillate the support body structure 24.

In operation, the winding drums 88 and 90 are first rotated by their synchronous driving motors to position the support body structure 24 in the position thereof illustrated in FIGS. 1 and 2 of the drawings. Then, the barge 78 or a plurality of shorter barges may be loaded on and comprise a part of the load carrier or wheeled dolly 46. Thereafter, the assembly 74 is actuated so as to longitudinally shift the rack gears or bars 64 upwardly along the ramp structure 12 whereby the load carrier 46 including the barge 78 will be received in the recesses or notches formed in the support disks 26, 28, 30 and 32. It will be noted from FIG. 2 of the drawings that the combined assemblage comprising the load carrier 46 and barge 78 defines a wedge-shaped structure which is wedgingly seatably receivable in the recesses 26', 28', 30' and 32'. When the rack bars 64 have been elevated to a position with the load carrier and barge wedgingly and seatingly received in the recesses or entrance openings 26', 28', 30' and 32', the pivot shafts or fasteners 66 by which the lower ends of the rack bars 64 are pivotally secured to the load carrier 46 coincide with the axis of rotation of the support body structure 24. Accordingly, the synchronous motor driven winding drums 88 and 90 may be rotated in a manner to oscillate the support body structure 24 from the position thereof illustrated in phantom lines in FIGS. 2 and 4 of the drawings to the position thereof illustrated in solid lines in FIG. 3 of the drawings. Of course, the barge 78 will thus be inverted and the load of bulk material previously within the barge 78 is automatically dumped therefrom between the support disks 26, 28, 30 and 32 down into the opening or recess 14 and the discharge throat 16 for reception in the aforementioned storage bins (not shown). Thereafter, the synchronous motor driven winding drums 88 and 90 may be reversed in operation so as to oscillate the support body structure 24 from the position thereof illustrated in FIG. 3 of the drawings back to the position thereof illustrated in FIG. 2 of the drawings after which the assembly 74 may be actuated to shift the rack bars 64 downwardly along the ramp structure 12 so as to lower the load carrier or wheeled dolly 46 and the empty barge 78 back into the water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

I claim:

1. An unloader comprising a support structure, a horizontally disposed elongated body structure journaled from said support structure for oscillation about a longitudinal axis of said body structure, an upright load carrier supported from said support structure for shifting toward and away from said body structure laterally of said axis, said body structure including portions thereof defining a laterally outwardly opening recess, said load carrier being shiftable toward said body structure and into said recess, the portions of said body structure defining said recess and said load carrier including coacting wedge surfaces operable to guide said load carrier into said recess and to support said load carrier from said body structure free of direct support from said support structure and against lateral and rotational shifting relative to said body structure during subsequent oscillation thereof to and back from a position with said load carrier in inverted dumping position, said support structure defining an inclined ramp from an upper portion of which said body structure is journaled and along which said load carrier is shiftable, the lower end of said ramp being adapted to extend downwardly into a body of water.

2. The combination of claim 1 wherein said load carrier includes a dolly supported from said ramp and a barge adapted to be floated on said water and removably received on said dolly.

3. The combination of claim 1 wherein said ramp includes an upwardly opening recess formed therein in which said body structure is journaled, the lower portion of said recess including a downwardly extending discharge outlet adapted to extend downwardly toward and open into bulk material receiving bins disposed below said recess.

4. An unloader comprising a support structure, a horizontally disposed elongated body structure journaled from said support structure for oscillation about a longitudinal axis of said body structure, an upright load carrier supported from said support structure for shifting toward and away from said body structure laterally of said axis, said body structure including portions thereof defining a laterally outwardly opening recess, said load carrier being shiftable toward said body structure along a predetermined path and into said recess, said load carrier and body structure portions including coacting means operable to support said load carrier from said body structure free of direct support from said support structure and against lateral and rotational shifting relative to said body structure during subsequent oscillation thereof to and back from a position with said load carrier in inverted dumping position, said unloader including a plurality of driven members supported therefrom for movement along said path and to which said load carrier is pivotally secured for oscillation relative thereto about aligned axes extending longitudinally of said support member, said axes, when said load carrier is supported in said recess defined by said body structure, coinciding with the axis of oscillation of said body structure relative to said support structure.

5. The combination of claim 4 wherein support structure defines an inclined ramp extending along said path and upwardly along which said load carrier is movable, said body structure being disposed at an upper elevation of said ramp and said recess opening downwardly along said ramp.

6. An unloader comprising a support structure, a horizontally disposed elongated body structure journaled from said support structure for oscillation about a longitudinal axis of said body structure, an upright load carrier supported from said support structure for shifting toward and away from said body structure laterally of said axis, said body structure including portions thereof defining a laterally outwardly opening recess, said load carrier being shiftable toward said body structure and into said recess, the portions of said body structure defining said recess and said load carrier including coacting wedge surfaces operable to guide said load carrier into said recess and to support said load carrier from said body structure free of direct support from said support structure and against lateral and rotational shifting relative to said body structure during subsequent oscillation thereof to and back from a position with said load carrier in inverted dumping position, said body structure including a plurality of interconnected axially spaced and aligned transverse members including arcuate marginal portions whose centers of curvature lie on said axis, said support structure including a plurality of sets of journaled rollers with which said arcuate marginal portions are engaged and from which said body structure is rollingly cradled.

7. The combination of claim 6 wherein said support structure defines an inclined ramp from an upper portion of which said body structure is journaled and along which said load carrier is shiftable, the lower end of said ramp being adapted to extend downwardly into a body of water, said ramp including an upwardly opening recess formed therein in which said body structure is journaled, the lower portion of said recess including a downwardly extending discharge outlet adapted to extend downwardly toward and open into bulk material receiving bins disposed below said recess.

8. The combination of claim 7 wherein said load carrier includes a dolly supported from said ramp and a barge adapted to be floated on said water and removably received on said dolly.

9. An unloader comprising a support structure, a horizontally disposed elongated body structure journaled from said support structure for oscillation about a longitudinal axis of said body structure, an upright load carrier supported from said support structure for shifting toward and away from said body structure laterally of said axis, said body structure including portions thereof defining a laterally outwardly opening recess, said load carrier being shiftable toward said body structure and into said recess, said load carrier and body structure portions including coacting means operable to support said load carrier from said body structure free of direct support from said support structure and against lateral and rotational shifting relative to said body structure during subsequent oscillation thereof to and back from a position with said load carrier in inverted dumping position, said unloader including a plurality of driven members movable along said ramp and to which said load carrier is pivotally secured for oscillation relative thereto about aligned axes extending longitudinally of said support member, said axes, when said load carrier is supported in said recess defined by said body structure, coinciding with the axis of oscillation of said body structure relative to said support structure, said driven members comprising elongated rack gears generally paralleling and longitudinally shiftable relative to said support member in paths extending in the direction of shifting of said load carrier relative to said support structure, said load carrier being pivotally connected to the lower ends of said rack gears.

10. The combination of claim 9 including driven shaft means journaled from said support structure and including gear wheels mounted thereon for rotation therewith and meshed with said rack gears.

11. The combination of claim 10 wherein said support structure defines an inclined ramp from an upper portion of which said body structure is journaled and along which said load carrier is shiftable, the lower end of said ramp being adapted to extend downwardly into a body of water, said ramp including an upwardly opening recess formed therein in which said body structure is journaled, the lower portion of said recess including a downwardly extending discharge outlet adapted to extend downwardly toward and open into bulk material receiving bins disposed below said recess.

12. The combination of claim 11 wherein said load carrier includes a dolly supported from said ramp and a barge adapted to be floated on said water and removably received on said dolly.